United States Patent
Sajayan et al.

(10) Patent No.: US 8,112,652 B2
(45) Date of Patent: Feb. 7, 2012

(54) MULTIPROCESSOR SYSTEM POWER MANAGEMENT OF SHARED MEMORIES POWERING DOWN MEMORY BANK ONLY WHEN ALL PROCESSORS INDICATE NOT POWERING THAT MEMORY BANK

(75) Inventors: Sajish Sajayan, C.V. Raman Nagar (IN); Alok Anand, Bangalore (IN); Sudhakar Surendran, Bangalore (IN); Ashish Rai Shrivastava, Sugar Land, TX (US); Joseph R. Zbiciak, Arlington, TX (US)

(73) Assignee: Texas Instruments Incorporated, Dallas, TX (US)

( * ) Notice: Subject to any disclaimer, the term of this patent is extended or adjusted under 35 U.S.C. 154(b) by 421 days.

(21) Appl. No.: 12/356,274

(22) Filed: Jan. 20, 2009

(65) Prior Publication Data
US 2009/0249105 A1 Oct. 1, 2009

Related U.S. Application Data

(60) Provisional application No. 61/022,008, filed on Jan. 18, 2008.

(51) Int. Cl.
*G06F 1/32* (2006.01)
(52) U.S. Cl. .................... 713/324; 713/320; 713/300
(58) Field of Classification Search ........... 713/300–340
See application file for complete search history.

(56) References Cited

U.S. PATENT DOCUMENTS

| | | | |
|---|---|---|---|
| 5,404,543 A * | 4/1995 | Faucher et al. | 713/323 |
| 5,713,029 A * | 1/1998 | Kaiser et al. | 713/322 |
| 5,815,697 A * | 9/1998 | Bosshart et al. | 712/236 |
| 6,321,313 B1 * | 11/2001 | Ishii et al. | 711/163 |
| 6,539,487 B1 * | 3/2003 | Fields et al. | 713/340 |
| 6,738,861 B2 * | 5/2004 | Lawrence | 711/106 |
| 7,010,656 B2 * | 3/2006 | Gupta | 711/165 |
| 7,380,048 B2 * | 5/2008 | Lawrence | 711/5 |
| 7,411,857 B2 * | 8/2008 | Schaefer | 365/227 |
| 7,428,644 B2 * | 9/2008 | Jeddeloh et al. | 713/300 |
| 7,437,579 B2 * | 10/2008 | Jeddeloh et al. | 713/300 |
| 7,466,620 B2 * | 12/2008 | Mohammad et al. | 365/230.06 |
| 7,500,126 B2 * | 3/2009 | Terechko et al. | 713/323 |
| 7,539,879 B2 * | 5/2009 | Terechko et al. | 713/300 |
| 7,558,972 B2 * | 7/2009 | Hoshino et al. | 713/300 |
| 7,895,453 B2 * | 2/2011 | Kasahara et al. | 713/300 |
| 2005/0210206 A1 * | 9/2005 | Woodbridge et al. | 711/154 |
| 2008/0034234 A1 * | 2/2008 | Shimizu et al. | 713/320 |
| 2009/0083561 A1 * | 3/2009 | Kaburlasos et al. | 713/323 |
| 2009/0313490 A1 * | 12/2009 | Tani | 713/320 |

* cited by examiner

*Primary Examiner* — Raymond Phan
(74) *Attorney, Agent, or Firm* — Robert D. Marshall, Jr.; W. James Brady; Frederick J. Telecky, Jr.

(57) ABSTRACT

This invention manages power down and wakeup of shared memories in a multiprocessor system. A register for each shared memory has bits corresponding to each master. When a master wants to power down a memory, it sets its corresponding bit in the register. A hardware power down controller for the memory bank powers the memory bank if any processor signals powering the memory bank. The hardware power down controller for the memory bank powers down the memory bank only if all processor signal powering down the memory bank. The hardware power down controller waits for all masters to set their corresponding bits in the register before initiating power down of the memories. Software running on any processor has a view of the shared memory independent of the other processors and no inter-processor communication is needed.

3 Claims, 2 Drawing Sheets

MULTIPROCESSOR SYSTEM POWER MANAGEMENT OF SHARED MEMORIES POWERING DOWN MEMORY BANK ONLY WHEN ALL PROCESSORS INDICATE NOT POWERING THAT MEMORY BANK

CLAIM OF PRIORITY

This application claims priority under 35 U.S.C. 119(e)(1) to U.S. Provisional Application No. 61/022,008 filed Jan. 18, 2008.

TECHNICAL FIELD OF THE INVENTION

The technical field of this invention is power controlling shared memories in a multiprocessor system.

BACKGROUND OF THE INVENTION

SRAM memories in advanced technology nodes consume significant amount of leakage power. Powering down memories when not in use for long periods is one of the methods used to reduce overall power consumption in a system on a chip (SOC). Memories that are shared by multiple masters need special handling for power down and wakeup.

Conventionally, power-down and wake-up is software controlled by a selected one of the masters. In symmetric systems where multiple masters run code independent of each other, this requires software overhead for inter-processor communication to identify when memories can be powered down or woken up

SUMMARY OF THE INVENTION

This invention is a simple hardware controlled scheme for managing power down and wakeup of shared memories, or in general, any shared peripheral. A register for the shared memory has bits corresponding to each master. When a master wants to power down a memory, it sets its corresponding bit in the register. The hardware powerdown controller waits for all masters to set their corresponding bits in the register before initiating power down of the memories. Whenever a master wants to wake up the memory, it clears the corresponding bit. The powerdown controller initiates a wakeup sequence for the memory upon a wakeup request from any of the masters.

This method is hardware driven unlike a software driven approach to control power down/wakeup of shared memories of the prior art. This offload power management of shared memories from software to hardware. Software running on one processor in a multi-processor system can have a view of the shared memory independent of the other processors. Inter-processor communication between software running on the different processors is not needed in this invention to decide when the shared memory is powered up/down.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
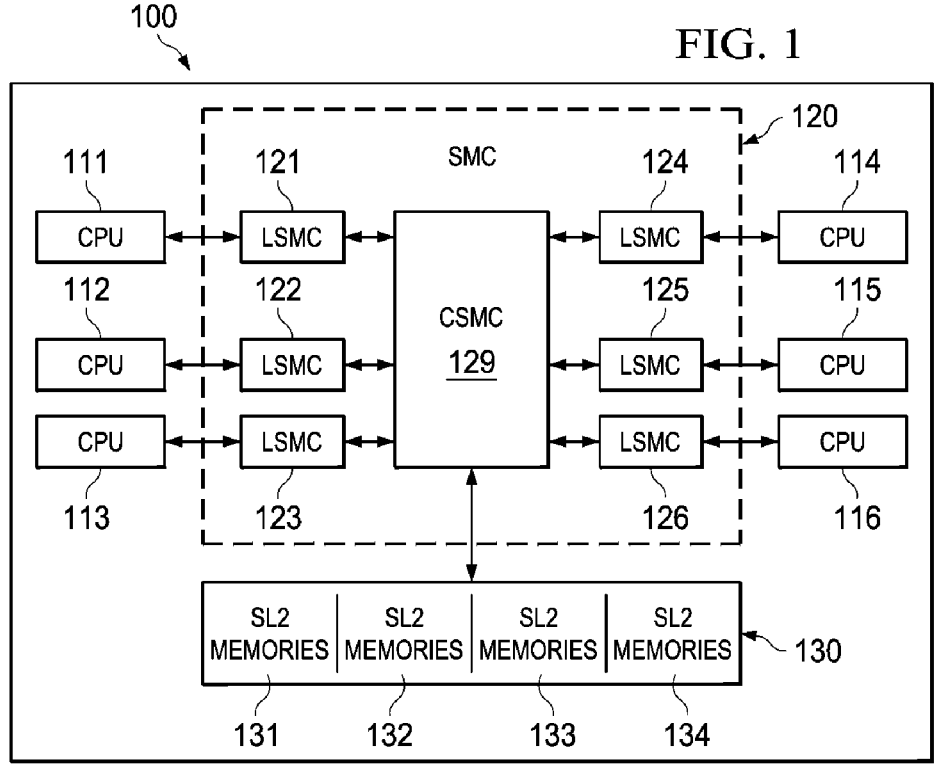
FIG. 1 is a block diagram of a multiprocessor system integrated circuit using shared memory.

This invention is useful in a multiprocessor integrated circuit such as illustrated in FIG. 1. Example multiprocessor integrated circuit 100 includes: six central processing units 111, 112, 113, 114, 115 and 116; a shared memory controller 120 including six local shared memory controllers 121, 122, 123, 124, 125 and 126 connected to corresponding central processing units and central shared memory controller 129; and shared memory 130 including separately energizable memory banks 131, 132, 133 and 134. Multiprocessor integrated circuit 100 includes plural central processing units sharing a common memory. Note the number of central processing units and memory banks shown in FIG. 1 is exemplary only. This architecture creates problems solved by this invention.

Each of the central processing units 111 to 116 is a stand-alone programmable data processor. In the preferred embodiment these have the same instruction set architecture (ISA). This is known as homogenous multiprocessing. However, this invention is also applicable to heterogeneous multiprocessing in which the central processing unit employ two or more ISAs. Each central processor preferably includes a processing core for data processing operations, a data register file for temporary storage of operand data and results data and instruction and data cache. Each central processing unit operates under its own program. Each central processing unit uses shared memory controller 120 to access programs and data in shared memory 130.

Shared memory controller (SMC) 120 interfaces central processing units 111, 112, 113, 114, 115 and 116 to shared memory 130. In the preferred embodiment shared memory 130 is at the same level in the memory hierarchy as second level (L2) cache in central processing units 111, 112, 113, 114, 115 and 116. SMC 120 includes: Local SMC (LSMC) and Central SMC (CSMC). This partition is done to keep the GEM specific logic in the LSMC and the memory bank specific logic in the CSMC.

Figure 2:
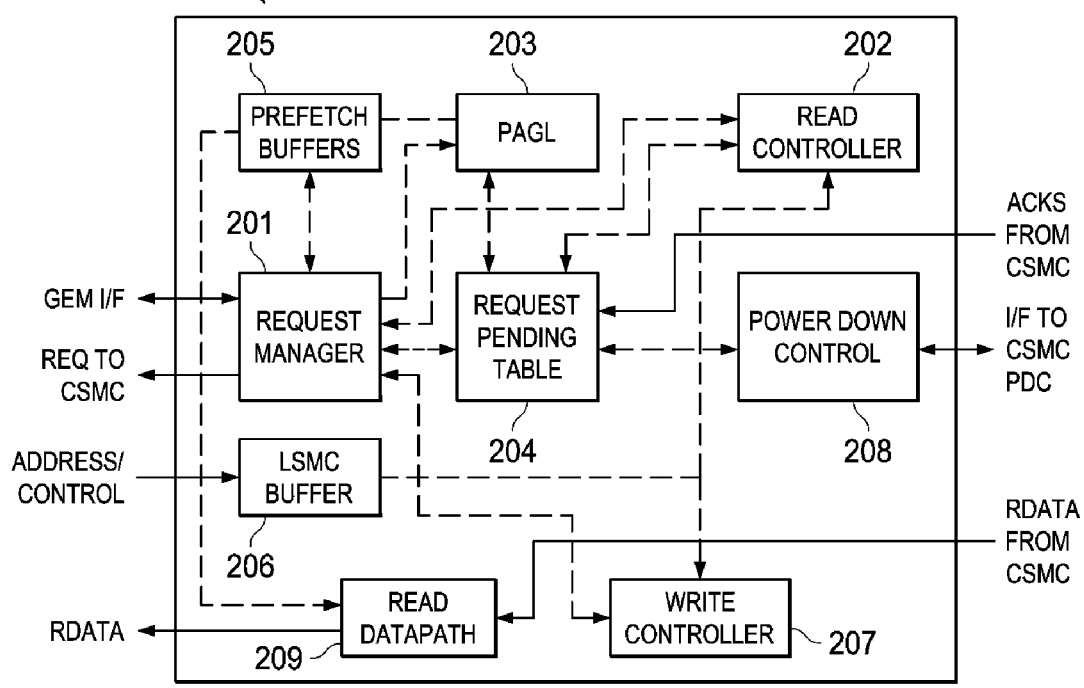
FIG. 2 is a block diagram of the local shared memory controller corresponding to one of the processors of the multiprocessor system.
Figure 3:
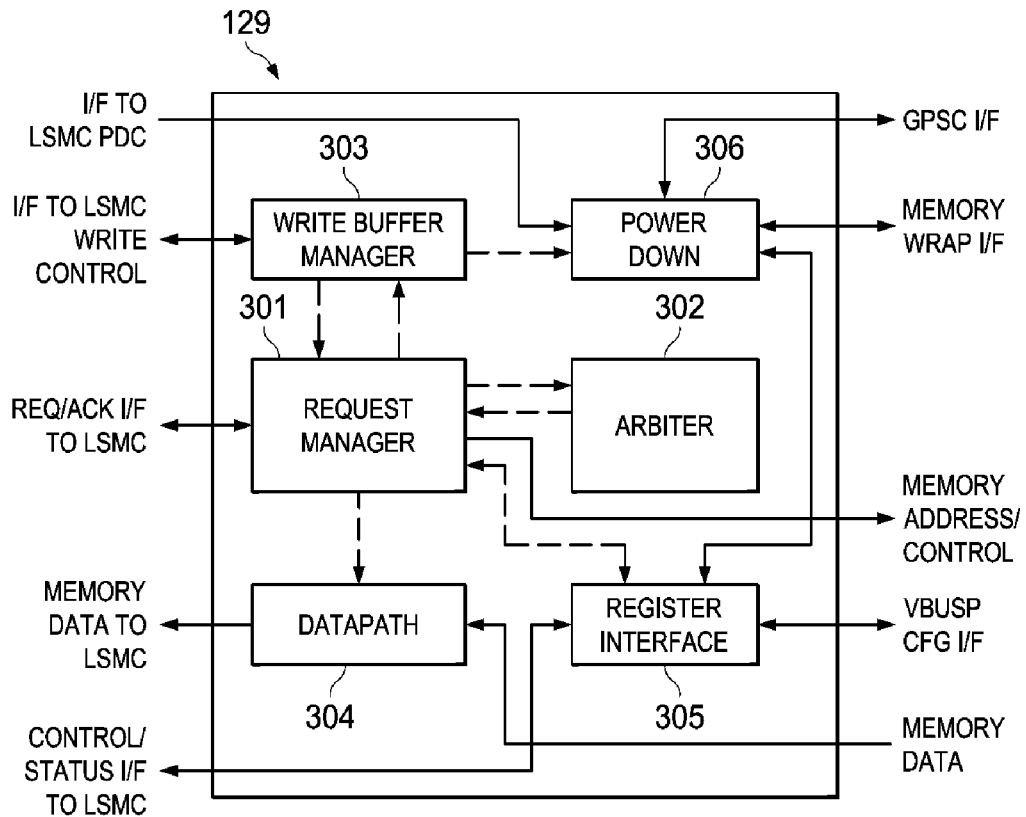
FIG. 3 is a block diagram of the central shared memory controller of the multiprocessor system.

FIG. 2 illustrates an exemplary local shared memory controller 121. LSMC 121 includes: request manager 201; read controller 202; prefetch access generation logic (PAGL) 203; request pending table 204; prefetch buffers 205; LSMC buffer 206; write controller 207; power down controller 208; and read datapath 209.

Request manager 201 interfaces with the corresponding CPU interface. Request manager 201 decodes the requests from CPU 111 and controls the different blocks with in LSMC 121. Request manager 201 handles the lookup of the prefetch buffers and figures out if a CPU 111 access hits or misses the prefetch buffers. Request manager 201 generates a system ready signal taking individual components of ready from read controller 202 and write controller 209. Request manager 210 controls read datapath 209 to CPU 111. Request manager 121 submits the read requests and prefetch requests to CSMC 129.

Read controller 202 manages all the read requests that go to memory banks 131, 132, 133 and 134. Read controller 202 contains per bank state machines that submit read requests to CSMC 129. Read controller 202 contains logic to stall CPU 111 using the cready signal.

Prefetch access generation logic 203 generates the prefetch requests to CSMC 129 to fill prefetch buffers 205. PAGL 203 calculates the addresses to be prefetched based on the type of access by CPU 111. Request manager 201 controls PAGL 203 when killing or aborting a prefetch request.

Request pending table 204 maintains the status of access requests and prefetch requests. Request pending table 204 splits incoming acknowledge signals from CSMC 129 for requests sent from LSMC 121 into real access and prefetch acknowledgments. Real access acknowledgments are routed to CPU 111 and read controller 202. Prefetch acknowledgments are routed to prefetch buffers 205. Request pending table 204 includes a number of entries direct mapping the number of logical memory banks 131, 132, 133 and 134.

Prefetch buffers 205 include data buffers with each logical memory bank 131, 132, 133 and 134. Thus the preferred embodiment includes four data buffers. Prefetch buffers 205 store prefetched data and address tags. Whenever a stored address tag matches the address of an access on the CPU interface and the prefetch data is valid, this data is directly forwarded from prefetch buffers 205 to CPU 111 without fetching from memory.

LSMC buffer 206 is a per-CPU command register which buffers the address and control signals on every access from the CPU. In the case of a write access, LSMC buffer 206 also buffers the write data.

Write controller 207 handles write requests from CPU 111. Writes use a token-based protocol. CSMC 129 has 4 per-bank write buffers. Writes from all CPUs arbitrate for a write token to write into the per-bank write buffers. Write controller 207 handles the token request interface with CSMC 129.

Power down controller 208 communicates with its counterpart in CSMC 129. Whenever the CSMC 129 power down controller requests a sleep or wakeup, power down controller 208 ensures that LSMC 121 is in a clean state before allowing the CSMC 129 power down controller to proceed.

Read datapath 209 receives control signals from request manager 201 corresponding to the type of access. Read datapath 209 multiplexes data from either prefetch buffer 205 or the memory data from CSMC 129 which is registered and forwarded to CPU 111.

Central shared memory controller (CSMC) 129 includes: request manager 301; arbiter 302; write buffer manager 303; datapath 304; register interface 305; and power down controller 306.

Request manager 301 receives requests from all CPUs 111 to 116. Request manager 301 submits these requests to a corresponding per-bank arbiter. Request manager 310 generates the memory control signals based on the signals from the CPU which won the arbitration. Request manager 301 contains the atomic access monitors which manage atomic operations initiated by a CPU.

Arbiter 302 is a least recently used (LRU) based arbiter. Arbiter 302 arbitrates among requests from all six CPUs for each memory bank 131, 132, 133 and 134. Arbitration uses the following priority. Write requests have the highest priority. Only one write request will be pending to any particular bank at a time. Real read requests have the next lower priority. A real read request is selected only if there are no pending write requests from any CPU. Prefetch requests have the lowest priority. Prefetch requests are selected only if there are no write requests or real read requests from any CPU.

Among CPUs requesting access at the same priority level, arbiter 302 implements a standard LRU scheme. Arbiter 302 has a 6 bit queue with one entry per CPU in each queue. The head of the queue is always the LRU. If the requester is the LRU, then it automatically wins the arbitration. If the requester is not the LRU, then the next in the queue is checked and so on. The winner of a current arbitration is pushed to the end of the queue becoming the most recently used. All other queue entries are pushed up accordingly.

Write buffer manager 303 contains per-bank write buffers. Write buffer manager 303 interfaces with the token requests from a write controller 207 of one of the LSMCs 121 to 126. Token arbitration uses a LRU scheme. Each per-bank write buffer of write buffer manager includes six finite state machines, one for each CPU. These finite state machines control generation of token requests to arbiter 302. Write buffer manager 303 registers and forwards the token grant from arbiter 302 to the corresponding CPU. Upon receiving the token grant the CPU has control of the per-bank write buffer and proceeds with the write.

Datapath 304 multiplexes between data from different memory pages and forwards data to the LSMC of the CPU which won the arbitration.

Register interface 305 supports a VBUSP interface through which software can program several registers. These registers control the operation of shared memory controller 120. Signals are exported from the register interface to different blocks in LSMCs 121, 122, 123, 124, 125 and 126 and CSMC 129.

Power down controller 306 interfaces with the programmable registers through which software can request a sleep mode or wakeup of memory banks 131, 132, 133 and 134. Power down controller 306 interfaces with the power down controller 208 of each LSMC 121, 122, 123, 124, 125 and 126, and memory wrappers to put the memory banks 131, 132, 1332 and 134 into sleep mode and wakeup.

Figure 4:
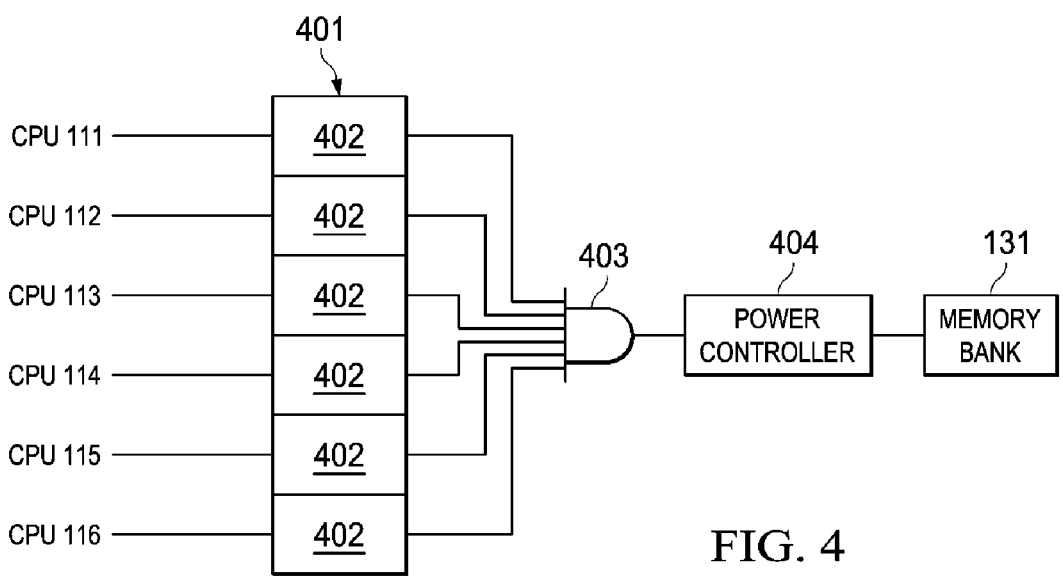
FIG. 4 is a block diagram of the power controller portion of the this invention.

FIG. 4 illustrates a portion of central shared memory controller 129 that controls the power state of one on the memory banks. FIG. 4 illustrates circuits corresponding to each one of the independently powerable memory banks 131, 132, 133 and 134. Power control register 401 includes six bits 402. Each CPU 111, 112, 113, 114, 115 and 116 can set or reset a corresponding one of the six bits 402. A CPU will set a bit to power the corresponding memory bank. A CPU will reset a bit to power down the corresponding memory bank.

AND gate 403 samples the state of all six bits 402. If all the bits 403 are reset (0), then AND gate 403 generates a 0 output. IF any one of the bits 403 is set, then AND gate 403 generates a 1 output.

Power controller 404 receives the output of AND gate 403. If this output is 1, then power controller 404 powers memory bank 131. If this output is 0, then power controller 404 powers down memory bank 131.

Using this invention each CPU 111, 112, 113, 114, 115 and 116 seems to have independent control of memory bank 131. When a CPU signals power up for the memory bank, this invention ensures the memory bank is powered. When the CPU signals power down for the memory bank, the memory bank may not be powered down because another CPU may want the memory bank powered up. This does not interfere with the first CPU operation because it does not expect to access that memory bank.

What is claimed is:

1. A memory bank power controller in a shared memory multiprocessor system comprising:

a power control register for each independently powerable memory bank having a plurality of power control bits, each power control bit separately writeable by a corresponding one of a plurality of processors of said multiprocessor system;

an AND gate for each independently powerable memory bank having a plurality of inputs, each input connected to a corresponding one of said power control bits and an output; and a power controller for each independently powerable memory bank connected to said output of said AND gate, said power controller powering said corresponding memory bank for a first digital state of said output of said AND gate and not powering said corresponding memory bank for a second digital state opposite to said first digital state of said output of said AND gate.

2. A method of powering independently powerable memory banks in a shared memory multiprocessor system comprising the steps of:

powering a memory bank if any one processors of said multiprocessor system indicates powering said memory bank; and not powering a memory bank only if all processors of said multiprocessor system indicate not powering said memory bank.

3. The method of claim 2, further comprising:

storing said indications of powering or not powering a memory bank by each processor in a register corresponding to said memory bank.

\* \* \* \* \*